Figure 1:
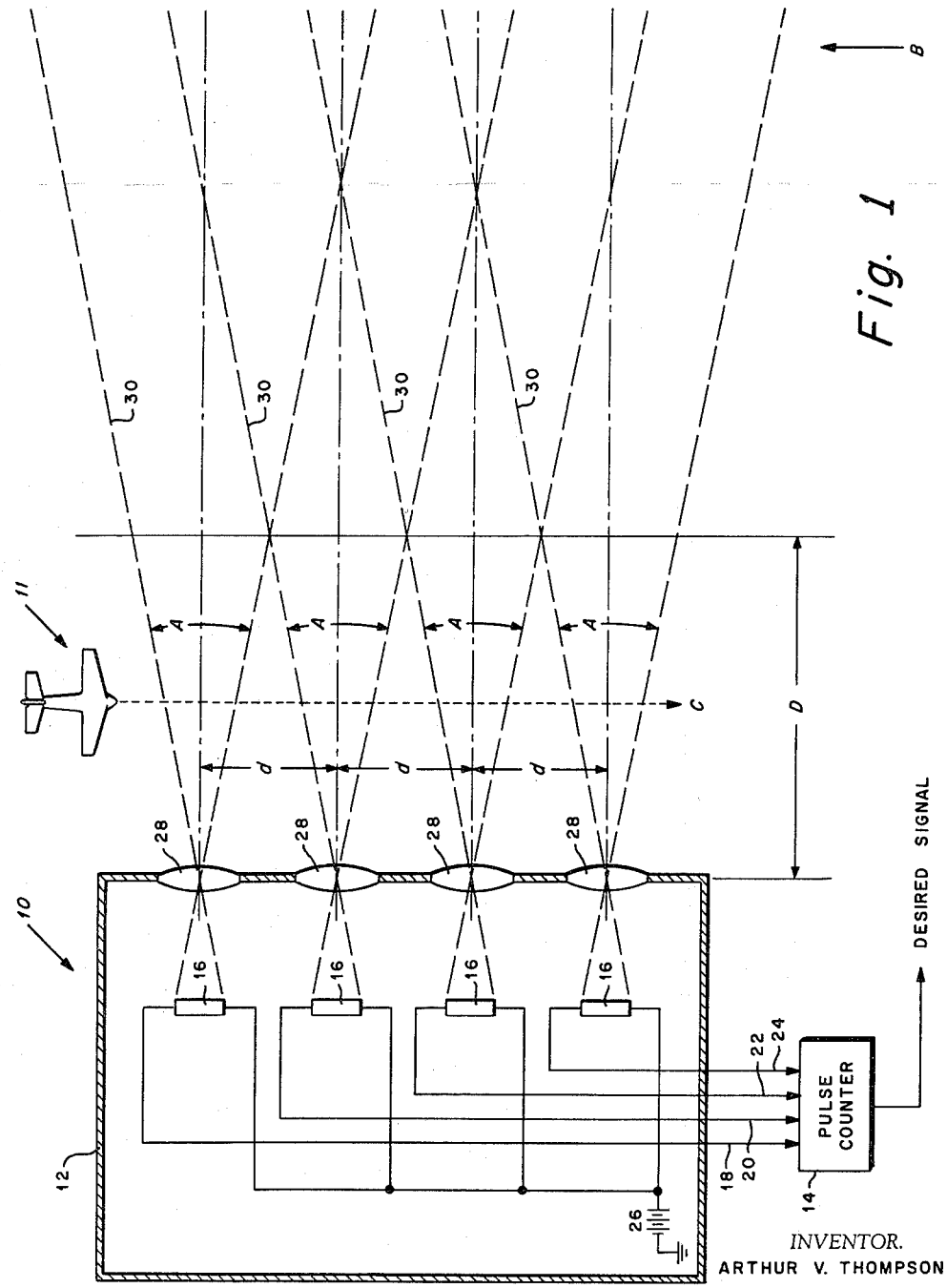

United States Patent Office 3,036,219
Patented May 22, 1962

3,036,219
PASSIVE RADIATION PROXIMITY DETECTOR
Arthur V. Thompson, Collegeville, Pa., assignor to the United States of America as represented by the Secretary of the Navy
Filed May 1, 1958, Ser. No. 733,240
5 Claims. (Cl. 250—220)
(Granted under Title 35, U.S. Code (1952), sec. 266)

The invention described herein may be manufactured and used by or for the Government of the United States of America for governmental purposes without the payment of any royalties thereon or therefor.

The present invention relates to proximity detection devices and more particularly to proximity detection devices utilizing passive radiation of optical wavelength.

By a proximity detection device is meant generally apparatus capable of detecting by the means described the presence of an object in space. Apparatus of this type may provide additional information on the location and relative movement of this object. Proximity detection devices may be used not only to detonate the warhead of a missile when the latter comes within range of its target, but may also be used for merely detecting the presence and measuring the relative movement of a particular object. An example of the latter function would be on board an aircraft carrier where it may be desired to know the speed of an approaching aircraft to wave it off should it not have the proper speed under the particular landing conditions including wind speed.

Present proximity detection devices which rely on radar are complex due to the use of a large number of components and are thereby limited for use only in the largest types of installations and missiles. Present proximity detection devices utilizing passive radiation are less dependable and cannot be used where portability is desired or in certain other circumstances such as where sensitivity to relative velocity is important as in parallel traveling missiles.

The present invention overcomes the disadvantages of prior proximity detection devices by combining the best features of both types. The invention relies on passive radiation of optical wavelength and provides for selective response to a preselected set of conditions including relative speed. Radiation of optical wavelength is meant to include ultraviolet, visible, infrared, and heat radiation. In one configuration of this invention, a plurality of radiation detectors are arranged with a suitable optical system to receive and respond to the desired radiation from successive segments of space. The detectors are combined with electrical circuitry to produce a pulse from each segment of space due to a change in radiation and the arrangement is adjustable to respond to a particular repetition rate of such pulses.

Accordingly, it is a first object of the present invention to provide passive proximity apparatus for use in missile and other applications.

A further object of this invention is the provision of passive proximity detection apparatus responsive to radiation of optical wavelength.

Still another object of this invention is the provision of passive proximity detection apparatus capable of selectively discriminating between background radiation and radiation associated with a target.

It is still a further object of this invention to provide passive proximity detection apparatus having the capability of being selectively responsive to an object having a particular relative speed and of distinguishing target radiation from background radiation.

Figure 2:
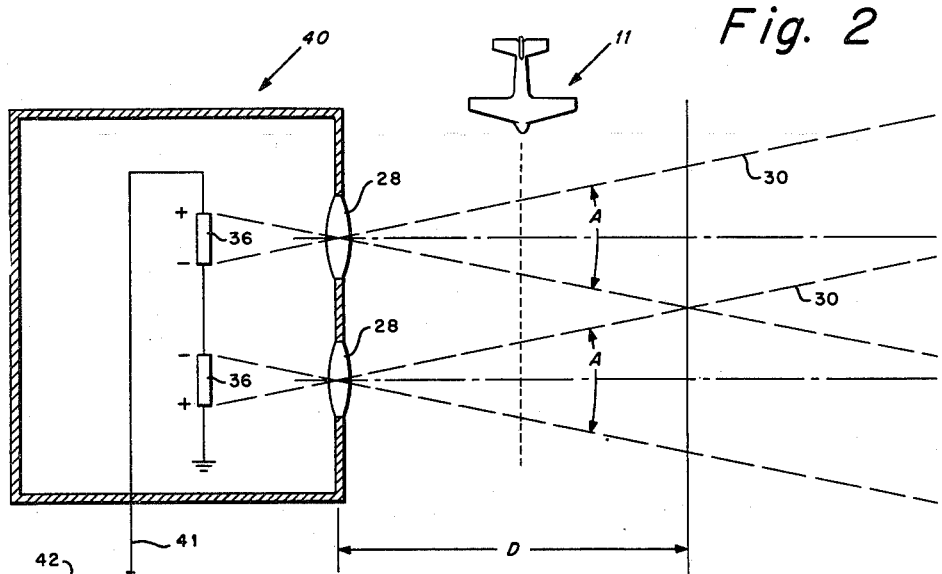
Figure 3:
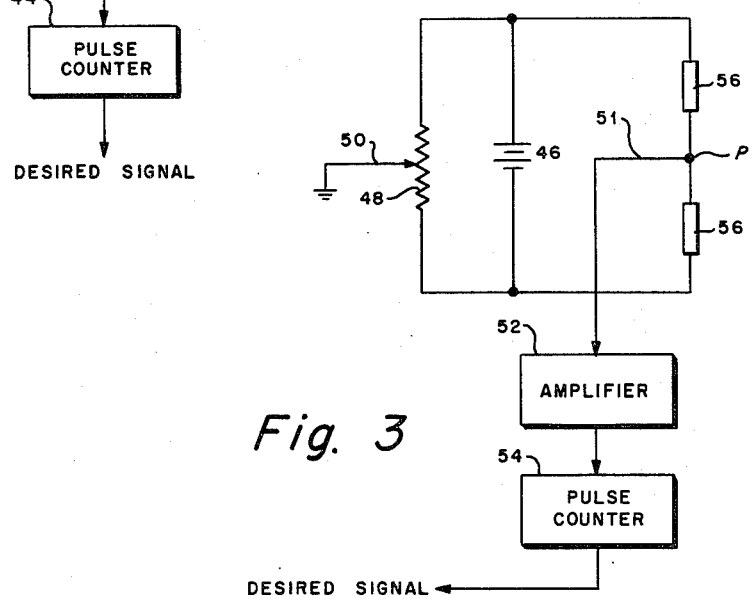

Other objects and advantages of this invention will hereinafter become more fully apparent from the following description of the annexed drawings wherein:

FIGS. 1, 2 and 3 illustrate preferred embodiments of this invention.

Referring now to the drawings, wherein like reference characters designate like or corresponding parts throughout the several views, there is shown in FIG. 1 the sensing unit 10 consisting of a housing 12 containing the detection elements and optical system described below which supply their signal to a pulse counter 14 or other appropriate equipment for a purpose to be described later. Within housing 12 there is shown a plurality of radiation detector elements 16 which, as is understood in the art, are selected for their photosensitivity to radiant energy of the particular wavelength to be detected. In the arrangement of FIG. 1, elements 16 are photoconductive in that their resistances to an applied voltage change in accordance with the amount of the applied radiation, such as infrared. Detector elements 16 are arranged to be connected electrically in parallel to deliver through leads 18, 20, 22 and 24 their output to pulse counter 14. The opposite ends of elements 16 are connected to one side of battery 26, as a source of constant voltage. Directly opposite each of elements 16 are a plurality of optical arrangements 28 schematically illustrated for directing the radiation to the respective elements 16. Each suitable optical arrangement 28 produces an image of a predetermined segment of space, as described below, on its respective element 16. It will be seen that each of the optical arrangements 28 covers a fan-shaped reception volume of thickness equal to an angle A. In the particular arrangement illustrated, optical arrangements 28 are located in a line and separated by a distance of $d$ from each other measured in the direction of relative movement between apparatus 16 and an object 11 to be detected, and the axes of the beams of vision of lenses 28 are substantially parallel or nearly so to each other. While the angle A illustrated shows the spread of the reception beam in a plane parallel to the paper, it is understood that each optical system arrangement may be designed to have an angle transverse to the plane of the paper which may be different. By an optical design which gives a large angle transverse to the paper and a plurality of units 10 properly spaced around the circumference of a missile, for example, the apparatus may be utilized to cover the full 360° angle. Radiation detectors 16 are of proper size and are sensitive to radiation in the region of interest, while the optical arrangements 28 can represent optical systems either reflective or refractive which collect radiant energy and together each with a detector 16 establishes a receiving fan-shaped lobe 30, a plurality or succession of such which are illustrated in FIG. 1.

It will be seen from FIG. 1 that at some distance D, lobes 30 intersect each other, while at some farther distance, such as in the area indicated generally by the arrow B, it is understood that due to defractive effects and inaccuracies in optical systems, the multiple beams merge to become effectively a single beam in multiple size aperture and that any radiation or changes thereof at this distance produces simultaneous signals in all of detectors 16 and hence in effect represent the background radiation. A single field is essentially produced in the area B because the field configuration, size, and sensitivity gradient are enough alike so that there is a mergence at a range greater than some arbitrary value D at which the adjacent lobes 30 intersect each other. In the range from 0 to D, any radiation or changes thereof produce separate similar effects in each detector 16. By distinguishing between multiple time pulses and a single pulse of long duration a distinction can be made between motion of near and far objects. The pulse counter 14 is of a typical and usual design and is designed to receive a multiplicity of pulses reaching at different time intervals and for responding to that sequence in a particular way, as described in the operation of the device below.

The device shown in FIG. 1 operates as follows:

An object such as aircraft 11 to be detected passes along a direction indicated by arrow C within the range 0 to D. As each lobe 30 is crossed, there is a change of radiation reaching the respective detector 16 causing a change in its resistance and hence a signal or pulse. A plurality of such pulses caused by object 11 crossing several lobes pass along the electrical leads 18, 20, 22 and 24, respectively, to pulse counter 14 which responds to this particular sequence of pulses. As is understood in the art, pulse counter 14 can be adjusted to respond to a sequence of pulses having a particular repetition rate thereby permitting by adjustment of pulse counter 14 the exclusion of response where relative motion between apparatus 10 and an object 11 is outside a preselected range. This feature is especially advantageous when detector 10 is used in missiles traveling in salvo, or where generally it is desired to select a minimum value of relative motion.

Pulse counter 14 may be made, as is understood in the art, to respond by producing a signal for accomplishing detonation or other result by merely indicating on a counter the frequency of the pulses received from lines 18, 20, et seq. If desired, detector elements 16 may be connected in series rather than in parallel, thereby producing a series of pulses equivalent to an alternating current whose frequency is determined in part by the spacing $d$. In this arrangement, a bandpass filter instead of pulse counter 14 may be used to pass the desired range of frequencies only which can be used directly for the purpose desired.

Another arrangement embodying the principles of this invention is illustrated in FIG. 2 where there is shown sensing unit 40 having a pair of detector elements 36 and a pair of associated optical arrangements 28 as previously described. Elements 36 in this arrangement are photovoltaic cells for use with radiation in the visible spectra, such as ultraviolet radiation, and produce a voltage in response to such radiation, as understood in the art. Elements 36 are connected in series with their polarities reversed between ground and lead 41 to deliver their signals through an amplifier 42 and pulse counter 44. In this arrangement, it is seen that detector elements 36 are connected in balanced or opposite polarity to each other so that in effect the background radiation is balanced, and there is a net zero signal of in-phase radiation pulses. Additional pairs of elements 36 may be added in parallel to those illustrated to deliver their outputs either to lead 41 or by separate lead to amplifier 42 for combining in any conventional fashion to produce a series of pulses.

To provide for the balancing of background radiation in photoconductors such as thermistors, the arrangement of FIG. 3 is provided in which photoconductive detector elements 56 are connected in parallel across a battery 46 and a potentiometer 48 having a grounded wiper 50. From the center connection P between detector elements 56 lead 51 delivers the net signal to an amplifier 52 and thence to a pulse counter 54, which functions in the same manner as pulse counter 14 described in connection with FIG. 1. Wiper 50 is adjusted until there is no signal at P thereby balancing out the background radiation and compensating for differences in the characteristics of detectors 56. Of course, in both the arrangements of FIGS. 2 and 3, bandpass filters instead of pulse counters may be used as noted in connection with FIG. 1.

There has thus been provided proximity detection apparatus for responding selectively to the passive radiation of an object according to relative speed, direction and distance. The device described hereinabove is simple in construction, light in weight making it suitable for use in missiles of all sizes, and does not require, when so used, mounting in the front of the missile thereby releasing the front of the missile for guidance apparatus. Furthermore, because of the fact that the inventive apparatus, relies on passive radiation rather than on the use of reflected radiation initially provided by the proximity device itself, the device is inherently simpler, cheaper and more reliable.

Since certain changes in this invention may be made without departing from the spirit and the scope thereof it is intended that all matters contained in the foregoing description and shown in the accompanying drawing shall be interposed as illustrative and not in a limiting sense.

What is claimed is:

1. Proximity detection apparatus comprises, in combination, a plurality of photoconductive detection elements sensitive to passive radiation of a particular wavelength, means for completing at least one electric circuit through said elements and including means to establish current flow through said elements, a plurality of optical means having substantially parallel axes for directing respective radiations of said wavelength on said detection elements from only nonoverlapping portions of successive fan-shaped segments of space undergoing detection for moving objects, and means for responding in a preselected manner only to a particular range of frequencies of current pulses in said circuit caused by an object moving through said successive segments of space sensed by said detector elements.

2. Proximity detection apparatus comprising, in combination, a plurality of photoconductive detection elements sensitive to radiation of a particular wavelength, means having parallel axes for directing a radiation image of a discrete preselected volume in space on each respective element, power supply means for imposing a constant voltage on one side of each of said detection elements, and circuit means arranged to complete in parallel the circuits from said power supply means through each of said detector elements permitting current flow therethrough, said circuit means including means to receive pulses of current change produced by each of said detection elements due to changes in radiation from said preselected volumes in space and to respond to a preselected frequency of said pulses.

3. Proximity detection apparatus comprising, in combination, a plurality of photoconductive detection elements sensitive to radiation of a particular wavelength, means having parallel axes for directing radiation images from only nonoverlapping portions of successive segments of space within a predetermined distance from said apparatus on said elements, respectively, power supply means for imposing a constant voltage on one side of each of said detection elements, and circuit means arranged to complete in parallel the circuits from said power supply means through each of said detector elements permitting current flow therethrough, said circuit means including means to receive pulses of current change produced by each of said detection elements due to changes in radiation from said successive segments of space and to respond to a preselected frequency of said pulses.

4. Proximity detection apparatus comprising, in combination, at least one pair of photo-voltaic detection elements sensitive to passive radiation of a particular wavelength arranged electrically in series and in phase bucking relationship, means for completing at least one electric circuit through said elements and means to establish current flow through said elements, a plurality of optical means having parallel axes for directing respective radiations of said wavelength on said detection elements from only nonoverlapping portions of successive fan-shaped segments of space undergoing detection for moving objects, and means arranged to receive the electrical pulses produced by said detection elements due to changes in radiation in said successive segments of space and for responding in a predetermined manner to a preselected repetition rate of said pulses.

5. Proximity detection apparatus comprising, in combination, at least one pair of photoconductive detection elements sensitive to passive radiation of a particular wavelength arranged in series, means for completing at least one electric circuit through said elements, a plurality of optical means having parallel axes for directing respective radiations of said wavelength on said detection elements from only nonoverlapping portions of successive fan-shaped segment of space undergoing detection for moving objects, battery means in parallel across said pair of elements for establishing current flow through said detection elements, potentiometer means across said battery means with the wiper thereof grounded, means connected to the mid-point of said pair of elements to receive pulses in current caused by changes in radiation in said successive segments of space and for responding in a predetermined manner to a preselected repetition rate of said pulses.

References Cited in the file of this patent

UNITED STATES PATENTS

| | | |
|---|---|---|
| 2,000,642 | Lamb | May 7, 1935 |
| 2,016,036 | Fitzgerald | Oct. 1, 1935 |
| 2,142,378 | Sachtleben | Jan. 3, 1939 |
| 2,412,822 | Malter | Dec. 17, 1946 |
| 2,444,235 | Walker | June 29, 1948 |
| 2,479,031 | Tait | Aug. 16, 1949 |
| 2,503,768 | Riszdorfer | Apr. 11, 1950 |
| 2,573,729 | Rath | Nov. 6, 1951 |
| 2,688,564 | Forgue | Sept. 7, 1954 |
| 2,700,318 | Snyder | Jan. 25, 1955 |
| 2,813,983 | Hammer | Nov. 19, 1957 |

FOREIGN PATENTS

| | | |
|---|---|---|
| 701,935 | Great Britain | Jan. 6, 1954 |

OTHER REFERENCES

Dorsey: "Photoelectric Target for Missile Tests," Electronics (Engineering Edition), Nov. 1, 1957, pages 141 to 143 only.